(12) United States Patent  (10) Patent No.: US 7,051,275 B2
Gupta et al.  (45) Date of Patent: May 23, 2006

(54) ANNOTATIONS FOR MULTIPLE VERSIONS OF MEDIA CONTENT

(75) Inventors: Anoop Gupta, Woodinville, WA (US); David M Bargeron, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/396,984

(22) Filed: Sep. 15, 1999

(65) Prior Publication Data

US 2003/0196164 A1    Oct. 16, 2003

Related U.S. Application Data

(60) Provisional application No. 60/100,452, filed on Sep. 15, 1998.

(51) Int. Cl.
G06F 17/00 (2006.01)
(52) U.S. Cl. .................. 715/512; 715/500.1; 715/511
(58) Field of Classification Search ............... 707/511, 707/512; 715/511, 512, 500.1, 513
See application file for complete search history.

(56) References Cited

U.S. PATENT DOCUMENTS

| | | | |
|---|---|---|---|
| 4,649,499 A | 3/1987 | Sutton et al. | |
| 5,333,266 A | 7/1994 | Boaz et al. | 395/200 |
| 5,524,193 A | 6/1996 | Covington et al. | 395/154 |
| 5,526,407 A | 6/1996 | Russell et al. | |
| 5,572,643 A | 11/1996 | Judson | |
| 5,583,980 A | 12/1996 | Anderson | |
| 5,600,775 A | 2/1997 | King et al. | 395/806 |
| 5,633,916 A | 5/1997 | Goldhagen et al. | 379/67 |
| 5,699,089 A | 12/1997 | Murray | 345/146 |
| 5,732,216 A * | 3/1998 | Logan et al. | 395/200.3 |
| 5,809,250 A | 9/1998 | Kisor | |
| 5,838,313 A | 11/1998 | Hou et al. | 345/302 |
| 5,893,087 A | 4/1999 | Wlaschin et al. | 707/3 |
| 5,893,110 A | 4/1999 | Weber et al. | |
| 5,903,892 A | 5/1999 | Hoffert et al. | |
| 5,923,848 A | 7/1999 | Goodhand et al. | 395/200.49 |
| 5,969,716 A | 10/1999 | Davis et al. | |
| 5,991,365 A | 11/1999 | Pizano et al. | 379/88.13 |
| 6,006,241 A | 12/1999 | Purnaveja | |
| 6,009,462 A | 12/1999 | Birrell et al. | |
| 6,081,829 A | 6/2000 | Sidana | 709/203 |
| 6,085,185 A | 7/2000 | Matsuzawa et al. | |
| 6,105,055 A | 8/2000 | Pizano et al. | |
| 6,144,375 A | 11/2000 | Jain et al. | |
| 6,173,287 B1 | 1/2001 | Eberman et al. | |
| 6,173,317 B1 | 1/2001 | Chaddha et al. | |
| 6,230,172 B1 | 5/2001 | Purnaveja et al. | |

(Continued)

FOREIGN PATENT DOCUMENTS

EP    0 650 126 A1    4/1995

(Continued)

OTHER PUBLICATIONS

"Synchronized Multimedia Integration Language (SMIL) 1.0 Specification," W3C Recommendation Jun. 15, 1998, http://www.w3.org/TR/1998/REC-smil-19980615.*

(Continued)

*Primary Examiner*—Stephen Hong
*Assistant Examiner*—Adam M. Queler
(74) *Attorney, Agent, or Firm*—Perkins Coie LLP

(57) ABSTRACT

Multiple different versions of the same multimedia content are available to a multimedia server. An annotation server maintains annotations corresponding to the multimedia content, each such annotation corresponding to each of the different versions of the multimedia content.

15 Claims, 9 Drawing Sheets

U.S. PATENT DOCUMENTS

| | | | |
|---|---|---|---|
| 6,311,189 B1 | 10/2001 | deVries et al. | |
| 6,317,141 B1 | 11/2001 | Pavley et al. | |
| 6,332,144 B1 | 12/2001 | deVries et al. | |
| 6,360,234 B1 | 3/2002 | Jain et al. | |
| 6,366,296 B1 | 4/2002 | Boreczky et al. | |
| 6,438,566 B1* | 8/2002 | Okuno et al. | 709/231 |
| 6,449,653 B1* | 9/2002 | Klemets et al. | 709/231 |
| 6,452,615 B1 | 9/2002 | Chiu et al. | |
| 6,484,156 B1 | 11/2002 | Gupta et al. | |
| 6,571,295 B1* | 5/2003 | Sidana | 709/246 |
| 6,584,479 B1* | 6/2003 | Chang et al. | 707/512 |
| 6,724,401 B1* | 4/2004 | Hennum et al. | 715/765 |

FOREIGN PATENT DOCUMENTS

| | | |
|---|---|---|
| WO | WO 97/49251 | 12/1997 |

OTHER PUBLICATIONS

Nerney, Chris, RealNetworks unveils software line for multimedia displays, Network World, May 4, 1998, http://www.nwfusion.com/news/0504real.html.*

Booker, Eliis, "Microsoft And RealNetworks Wage Media War", InternetWeek, Jul. 10, 1998, http://www.techweb.com/wire/story/TWB19980710S0014.*

Carrer et al., "An Annotation Engine for Supporting Video Database Population," Aug. 15, 1996 http://hulk.bu.edu/pubs/papers/1996/carrer.-vane96/TR-08-15-96.ps.gz.*

Chen, Z., Tan, S. M., Sane, A., Li, Y., Campbell, R., and Xie, D. (1996). Video and Audio: Organization and Retrieval in the WWW. White Paper. Available at http://vosaic.com/corp/papers/www5.html Archived Jan. 28, 1998.*

"Some Frequently Asked Questions about RTP" archived Jun. 7, 1997 http://www.(p.7, "Choosing").columbia.edu/~hgs/rtp/faq.html.*

Abowd et al., "Teaching and Learning as Multimedia Authoring: The Classroom 2000 Project", Proceedings of the Multimedia '96, Boston, MA, USA, Nov. 1996, ACM Press, pp. 187-198.

Bessler et al., DIANE: A Multimedia Annotation System, Proceedings of the ECMAST '97, Milan, Italy, May 1997.

Carrer et al., "An Annotation Engine for Supporting Video Database Population", Multimedia Tools and Applications 5, 1997, Kluwer Academic Publishers, pp. 233-258.

Chalfonte et al., "Expressive Richness: A Comparison of Speech and Text as Media for Revision", Proceedings of the CHI' 91, 1991, ACM Press, pp. 21-26.

Davis et al., CoNote System Overview, 1995, Available at http://www.cs.cornell.edu/home/dph/annotation/annotations.html.

Gaines et al., "Open Architecture Multimedia Documents", Proceedings of the Multimedia '93, Anaheim, CA, Aug. 1993, ACM Press, pp. 137-146.

Gould et al., "Relativity Controller: Reflecting User Perspective in Document Spaces," Adjunct Proceedings of INTERCHI '93, 1993, ACM Press, pp. 125-126.

Kim et al., "VIRON: An Annotation-Based Video Information Retrieval System," Proceedings of COMPSAC '96, Seoul, South Korea, Aug. 1996, IEEE Press, pp. 298-303.

Laliberte et al., "A Protocol for Scalable Group and Public Annotations", 1997 NCA Technical Proposal, available at http://union.ncsa.uiuc.edu/—liberte/www/scalable-annotations.html.

Lawton et al., "The Knowledge Weasel Hypermedia Annotation System", Proceedings of the HyperText '93, Nov. 1993, ACM Press, pp. 106-117.

Lee et al., "Video Indexing—An Approach Based on Moving Object and Track", Proceedings of the SPIE, vol. 1908, 1993, pp. 25-36.

Marshall, "Toward and Ecology of Hypertext Annotations", Proceedings of the HyperText, Pittsburgh, PA, Jun. 1998, ACM Press, pp. 40-48.

Neuwirth et al., "Distributed Collaborative Writing: A Comparison of Spoken and Written Modalities for Reviewing and Revising Documents", Proceedings of the CHI '94, Boston, MA, Apr. 1994, ACM Press, pp. 51-57.

Phelps et al., "Multivalent Annotations, Proceedings of the First European Conference on Research and Advanced Technology for Digital Libraries", Pisa, Italy, Sep. 1997.

Roscheisen et al., "Shared Web Annotations as a Platform for Third-Party Value-Added, Information Providers: Architecture, Protocols, and Usage Examples", Technical Report CSDTR/DLTR 1997, Stanford University, Available at http://www.diglib.stanford.edu/rmr/TR/TR.html.

Schickler et al., "Pan-Browser Support for Annotations and Other Meta Information on the World Wide Web", Proceedings of the Fifth International World Wide Web Conference, Paris, France, May 1996, available at http://www5conf.inria.fr/fich_html/papers/p15/Overview.html.

Smith et al., "What Should a Wildebeest Say? Interactive Nature Films for High School Classrooms". Proceedings of the ACM Multimedia '97, Seattle, WA, Nov. 1997, ACM Press, pp. 193-201.

Smith, M., "DynaText: An Electronic Publishing System", Computers and the Humanities 27, 1993, pp. 415-420.

Stanford Online: Masters in Electrical Engineering, http://scpd.stanford.edu/ccc/telecom/onlinedegree.html.

Weber et al., "Marquee: A Tool for Real-Time Video Logging", Proceedings of CHI '94, Boston MA, Apr. 1994, ACM Press, pp. 58-64.

Wei, S.X., "MediaWeaver—A Distributed Media Authoring System for Networked Scholarly Workspaces", Multimedia Tools and Applications 6, 1998, Kluwer Academic Publishers, pp. 97-111.

Roscheisen et al., "Beyond Browsing: Shared Comments, SOAPs, Trails, and On-Line Communities", Computer Networks and ISDN Systems 27, 1995, pp. 739-749.

"Mastering Microsoft Office 97", Mosely and Boodey, SYBEX, Inc., 1996, pp. 755-763 and pp. 811-816.

Pizano et al., "Integrated multimedia messaging concepts and applications", Proceedings of the 1996 ACM symposium on Applied Computing, Philadelphia, Pennsylvania, USA, ACM Press, pp. 12-16, 1996.

"Webster's Encyclopedic Unabridged Dictionary of the English Language", 1989, Portland House, 3 pages.

"Merriam Webster's Collegiate Dictionary"; Tenth Edition; 1996; pp. 47, 55, 56' Total pages, 5.

32 USPQ2d; "U.S. Court of Appeals Federal Circuit"; In re Lowry, No. 93-1558; Decided Aug. 26, 1994; p 1031-1035.

Webster's Seventh New Collegiate Dictionary, Reg. U.S. Pat. Off.; 3 pages.

John D. Gabbe, et al; "Towards Intelligent Recognition of Multimedia Episodes in Real-Time Applications"; Multimedia 94, Oct. 1994 San Francisco, CA; pp. 227-236.

* cited by examiner

ANNOTATIONS FOR MULTIPLE VERSIONS OF MEDIA CONTENT

RELATED APPLICATIONS

This application claims priority to U.S. Provisional Application No. 60/100,452, filed Sep. 15, 1998, entitled "Annotations for Streaming Video on the Web: System Design and Usage", to Anoop Gupta and David M. Bargeron.

A portion of the disclosure of this patent document contains material which is subject to copyright protection. The copyright owner has no objection to the facsimile reproduction by anyone of the patent document or the patent disclosure, as it appears in the Patent and Trademark Office patent office file or records, but otherwise reserves all copyright rights whatsoever.

TECHNICAL FIELD

This invention relates to networked client/server systems and to methods of delivering and rendering multimedia content in such systems. More particularly, the invention relates to systems and methods of maintaining such content.

BACKGROUND OF THE INVENTION

The advent of computers and their continued technological advancement has revolutionized the manner in which people work and live. An example of such is in the education field, wherein educational presentations (such as college lectures, workplace training sessions, etc.) can be provided to a computer user as multimedia data (e.g., video, audio, text, and/or animation data). Today, such presentations are primarily video and audio, but a richer, broader digital media era is emerging. Educational multimedia presentations provide many benefits, such as allowing the presentation data to be created at a single time yet be presented to different users at different times and in different locations throughout the world.

These multimedia presentations are provided to a user as synchronized media. Synchronized media means multiple media objects that share a common timeline. Video and audio are examples of synchronized media—each is a separate data stream with its own data structure, but the two data streams are played back in synchronization with each other. Virtually any media type can have a timeline. For example, an image object can change like an animated .gif file, text can change and move, and animation and digital effects can happen over time. This concept of synchronizing multiple media types is gaining greater meaning and currency with the emergence of more sophisticated media composition frameworks implied by MPEG-4, Dynamic HTML, and other media playback environments.

The term "streaming" is used to indicate that the data representing the various media types is provided over a network to a client computer on a real-time, as-needed basis, rather than being pre-delivered in its entirety before playback. Thus, the client computer renders streaming data as it is received from a network server, rather than waiting for an entire "file" to be delivered.

Multimedia presentations may also include "annotations" relating to the multimedia presentation. An annotation is data (e.g., audio, text, video, etc.) that corresponds to a multimedia presentation. Annotations can be added by anyone with appropriate access rights to the annotation system (e.g., the lecturer/trainer or any of the students/trainees). These annotations typically correspond to a particular temporal location in the multimedia presentation and can provide a replacement for much of the "in-person" interaction and "classroom discussion" that is lost when the presentation is not made "in-person" or "live". As part of an annotation, a student can comment on a particular point, to which another student (or lecturer, assistant, etc.) can respond in a subsequent annotation. This process can continue, allowing a "classroom discussion" to occur via these annotations. Additionally, some systems allow a user to select a particular one of these annotations and begin playback of the presentation starting at approximately the point in the presentation to which the annotation corresponds.

The multimedia presentations available to a user may include different versions of the same underlying multimedia content. These different versions can have, for example, different resolutions, different bandwidth requirements, different presentation lengths, etc. Due to limitations of the user's computer system, or communication bandwidth limitations, different users may choose (or be required to choose) particular versions of the multimedia content, or users may switch between the different versions.

However, annotations typically correspond to a particular multimedia presentation. Since each of the different versions of the multimedia content is a different multimedia presentation, typical annotations correspond to only one of these presentations. This can be problematic because annotations added by a user to one particular version of the multimedia content (e.g., a low-resolution version) would be associated with that version and would not be available to users being presented with other versions (e.g., a high-resolution version).

One solution to this problem is to have a duplicative annotation structure in which each of the annotations that is created for a version of the multimedia content is duplicated in the annotation storage structure for each of the other versions. The necessary repetition in this solution, however, creates a particularly burdensome process in creating the annotations, as well as requiring a substantial amount of storage space to maintain all of the duplicated annotations.

The invention described below addresses this and other disadvantages of annotations, providing an improved way to create and maintain annotations corresponding to multimedia content.

SUMMARY OF THE INVENTION

A system has a multimedia server having access to multiple different versions of the same multimedia content. The system also has an annotation server that maintains annotations corresponding to the multimedia content. Each of the annotations maintained by the annotation server corresponds to all of the different versions of the multimedia content. Thus, the annotations are available to users being presented with any of the versions of the multimedia content, even though only one copy of the annotation is maintained by the annotation server.

According to one aspect of the invention, multiple annotations are maintained together as an annotation collection corresponding to particular multimedia content. Each annotation collection has a corresponding list of identifiers (e.g., uniform resource locators) for the different versions of the multimedia content to which it corresponds, and temporal positioning information associating the annotation with a temporal segment of the multimedia content.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

General Network Structure

Figure 1:
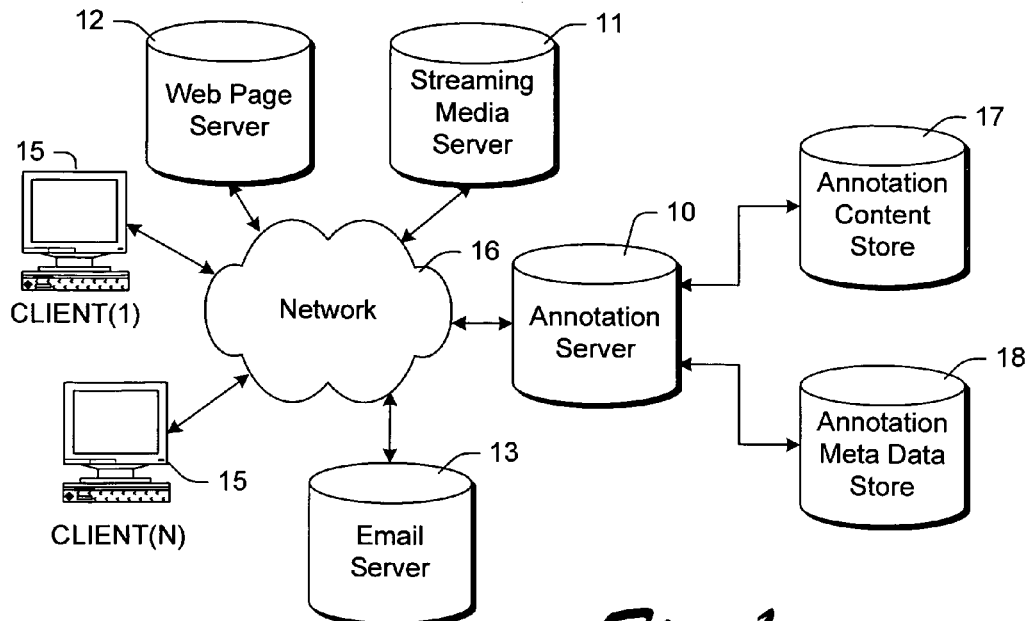
FIG. 1 shows a client/server network system and environment in accordance with the invention.

FIG. 1 shows a client/server network system and environment in accordance with the invention. Generally, the system includes multiple network server computers 10, 11, 12, and 13, and multiple (n) network client computers 15. The computers communicate with each other over a data communications network. The communications network in FIG. 1 comprises a public network 16 such as the Internet. The data communications network might also include, either in addition to or in place of the Internet, local-area networks and/or private wide-area networks.

Streaming media server computer 11 has access to streaming media content in the form of different media streams. These media streams can be individual media streams (e.g., audio, video, graphical, etc.), or alternatively composite media streams including two or more of such individual streams. Some media streams might be stored as files in a database or other file storage system, while other media streams might be supplied to the server on a "live" basis from other data source components through dedicated communications channels or through the Internet itself. Different versions of the same media content (e.g., low-resolution and high-resolution versions) may be available to server computer 11.

There are various standards for streaming media content and composite media streams. "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. Further details about ASF are available from Microsoft Corporation of Redmond, Wash.

Annotation server 10 controls the storage of annotations and their provision to client computers 15. The annotation server 10 manages the annotation meta data store 18 and the annotation content store 17. The annotation server 10 communicates with the client computers 15 via any of a wide variety of known protocols, such as the Hypertext Transfer Protocol (HTTP). The annotation server 10 can receive and provide annotations via direct contact with a client computer 15, or alternatively via electronic mail (email) via email server 13. The annotation server 10 similarly communicates with the email server 13 via any of a wide variety of known protocols, such as the Simple Mail Transfer Protocol (SMTP).

The annotations managed by annotation server 10 correspond to the streaming media available from media server computer 11. In the discussions to follow, the annotations are discussed as corresponding to streaming media. However, it should be noted that the annotations can similarly correspond to "pre-delivered" rather than streaming media, such as media previously stored at the client computers 15 via the network 16, via removable magnetic or optical disks, etc.

When a user of a client computer 15 accesses a web page containing streaming media, a conventional web browser of the client computer 15 contacts the web server 12 to request a Hypertext Markup Language (HTML) page. The client-based browser also submits requests to the media server 11 for streaming data, and the annotation server 10 for any annotations associated with the streaming data. When a user of a client computer 15 desires to add or retrieve annotations, the client computer 15 contacts the annotation server 10 to perform the desired addition/retrieval.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Figure 2:
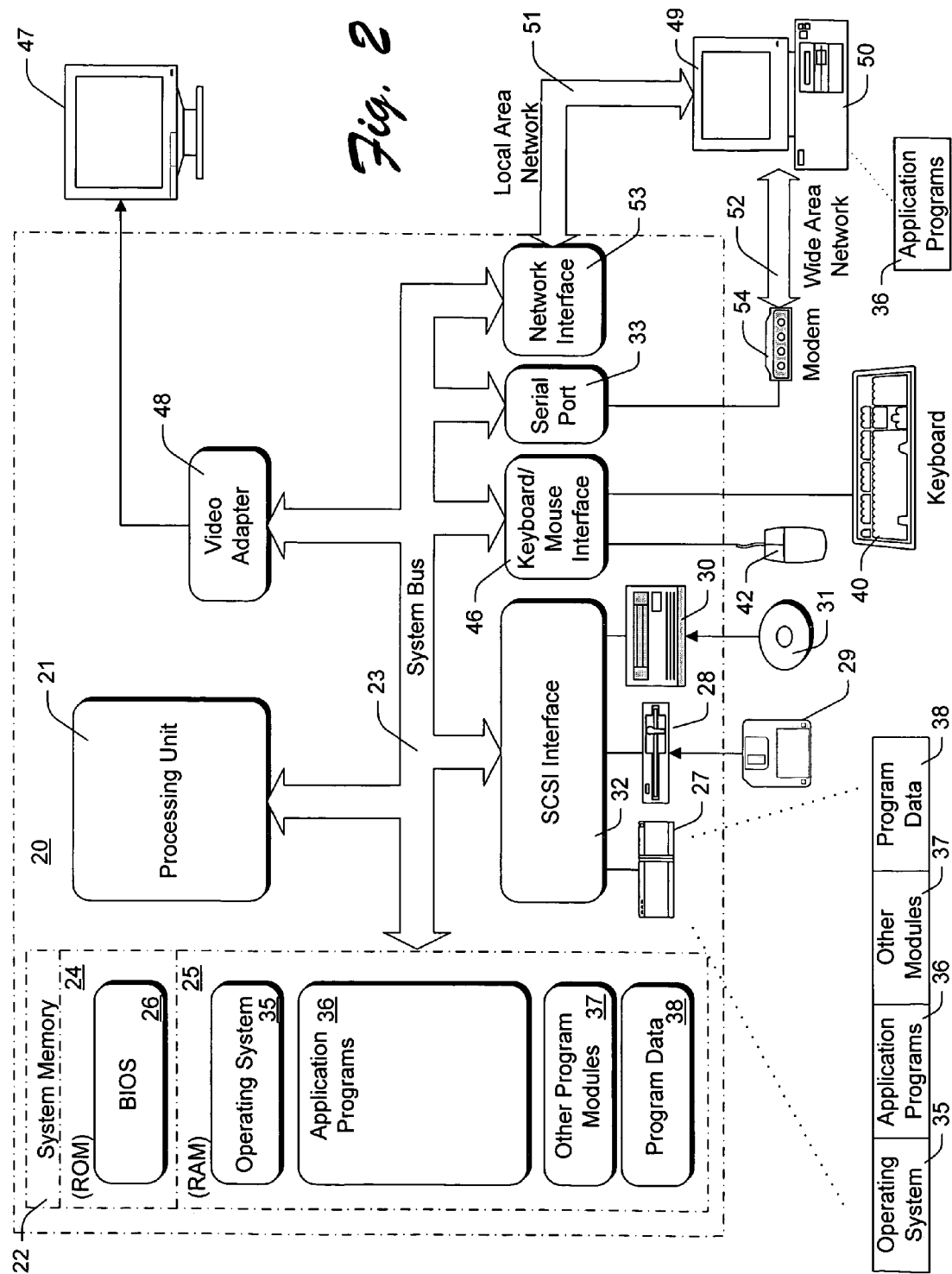
FIG. 2 shows a general example of a computer that can be used as a client or server in accordance with the invention.

FIG. 2 shows a general example of a computer 20 that can be used as a client or server in accordance with the invention. Computer 20 is shown as an example of a computer that can perform the functions of any of server computers 10–13 or a client computer 15 of FIG. 1.

Computer 20 includes one or more processors or processing units 21, a system memory 22, and a bus 23 that couples various system components including the system memory 22 to processors 21.

The bus 23 represents one or more of any of several types of bus structures, including a memory bus or memory controller, a peripheral bus, an accelerated graphics port, and a processor or local bus using any of a variety of bus architectures. The system memory includes read only memory (ROM) 24 and random access memory (RAM) 25. A basic input/output system (BIOS) 26, containing the basic routines that help to transfer information between elements within computer 20, such as during start-up, is stored in ROM 24. Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by an SCSI interface 32 or some other appropriate interface. The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to the system bus. A monitor 47 or other type of display device is also connected to the system bus 23 via an interface, such as a video adapter 48. In addition to the monitor, personal computers typically include other peripheral output devices (not shown) such as speakers and printers.

Computer 20 operates in a networked environment using logical connections to one or more remote computers, such as a remote computer 49. The remote computer 49 may be another personal computer, a server, a router, a network PC, a peer device or other common network node, and typically includes many or all of the elements described above relative to computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets, and the Internet. In the described embodiment of the invention, remote computer 49 executes an Internet Web browser program such as the "Internet Explorer" Web browser manufactured and distributed by Microsoft Corporation of Redmond, Wash.

When used in a LAN networking environment, computer 20 is connected to the local network 51 through a network interface or adapter 53. When used in a WAN networking environment, computer 20 typically includes a modem 54 or other means for establishing communications over the wide area network 52, such as the Internet. The modem 54, which may be internal or external, is connected to the system bus 23 via a serial port interface 33. In a networked environment, program modules depicted relative to the personal computer 20, or portions thereof, may be stored in the remote memory storage device. It will be appreciated that the network connections shown are exemplary and other means of establishing a communications link between the computers may be used.

Generally, the data processors of computer 20 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Client/Server Relationship

Figure 3:
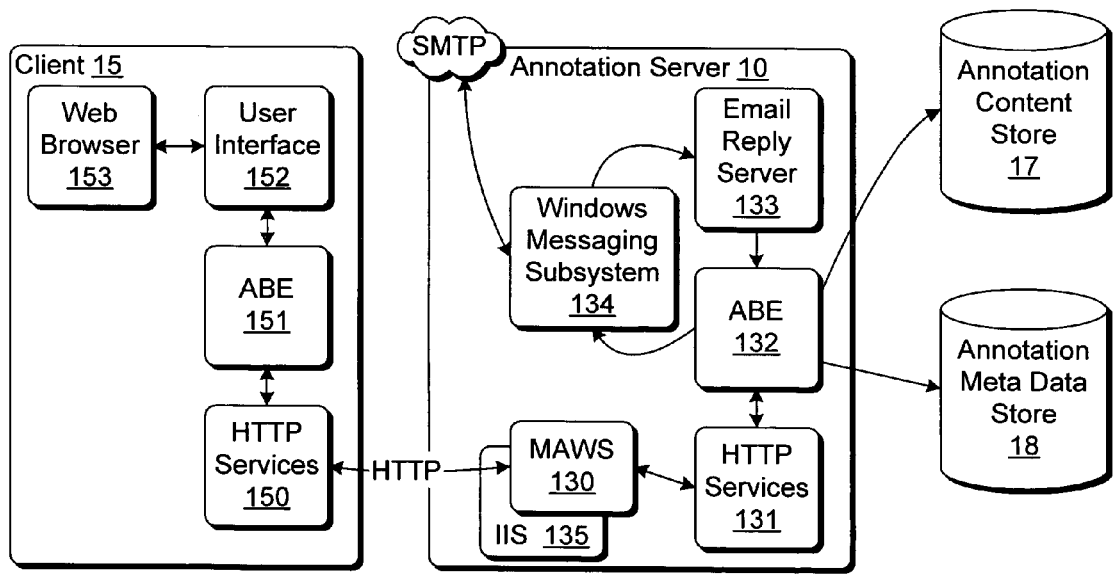
FIG. 3 is a block diagram illustrating an exemplary annotation server and client computer in more detail.

FIG. 3 illustrates an exemplary annotation server and client computer in more detail. As noted above, generally, commands are formulated at client computer 15 and forwarded to annotation server 10 via HTTP requests. In the illustrated embodiment of FIG. 3, communication between client 15 and server 10 is performed via HTTP, using commands encoded as Uniform Resource Locators (URLs) and data formatted as object linking and embedding (OLE) structured storage documents, or alternatively using Extensible Markup Language (XML).

Client 15 runs an HTTP services (HttpSvcs) module 150, which manages communication with server 10, and an annotation back end (ABE) module 151, which translates user actions into commands destined for server 10. A user interface (MMA) module 152 provides the user interface (UI) for a user to add and select different annotations, and be presented with the annotations. According to one implementation, the user interface module 152 supports ActiveX controls that display an annotation interface for streaming video on the Web.

Client 15 also executes a web browser module 153, which provides a conventional web browsing interface and capabilities for the user to access various servers via network 16 of FIG. 1. Web browser 153 also provides the interface for a user to select particular media streams for presentation. The user can select which one of different versions of multimedia content he or she wishes to receive from media server 11 of FIG. 1. This selection can be direct (e.g., entry of a particular URL or selection of a "low resolution" option), or indirect (e.g., entry of a particular desired playback duration or an indication of system capabilities, such as "slow system" or "fast system"). Alternatively, other media presentation interfaces could be used.

Annotation server 10 includes the Multimedia Annotation Web Server (MAWS) module 130, which is an Internet Services Application Programming Interface (ISAPI) plug-in for Internet Information Server (IIS) module 135. Together, these two modules provide the web server functionality of annotation server 10. Annotation server 10 also includes an HTTP Services module 131 which manages communication with client 15. In addition, annotation server 10 utilizes The Windows Messaging Subsystem 134 to facilitate communication with email server 13 of FIG. 1, and an email reply server 133 for processing incoming email received from email server 13.

Annotation server 10 further includes an annotation back end (ABE) module 132, which contains functionality for accessing annotation stores 17 and 18, for composing outgoing email based on annotation data, and for processing incoming email. Incoming email is received and passed to the ABE module 132 by the Email Reply Server 133. Annotation content authored at client 15, using user interface 152, is received by ABE 132 and maintained in annotation content store 17. Received meta data (control information) corresponding to the annotation content is maintained in annotation meta data store 18. The annotation content and meta data can be stored in any of a variety of conventional manners, such as in SQL relational databases (e.g., using Microsoft "SQL Server" version 7.0, available from Microsoft Corporation). Annotation server 10 is illustrated in FIG. 3 as maintaining the annotation content and associated control information (meta data) separately in two different stores. Alternatively, all of the annotation data (content and meta information) can be stored together in a single store, or content may be stored by another distinct storage system on the network 16 of FIG. 1, such as a file system, media server, email server, or other data store.

Each of the annotations maintained in annotation stores 17 and 18 corresponds to each of the different versions of particular multimedia content available to media server 11. Thus, regardless of the number of different versions of particular multimedia content available to media server 11, each annotation created by annotation server 10 is maintained as a single copy corresponding to all of these different versions.

Figure 4:
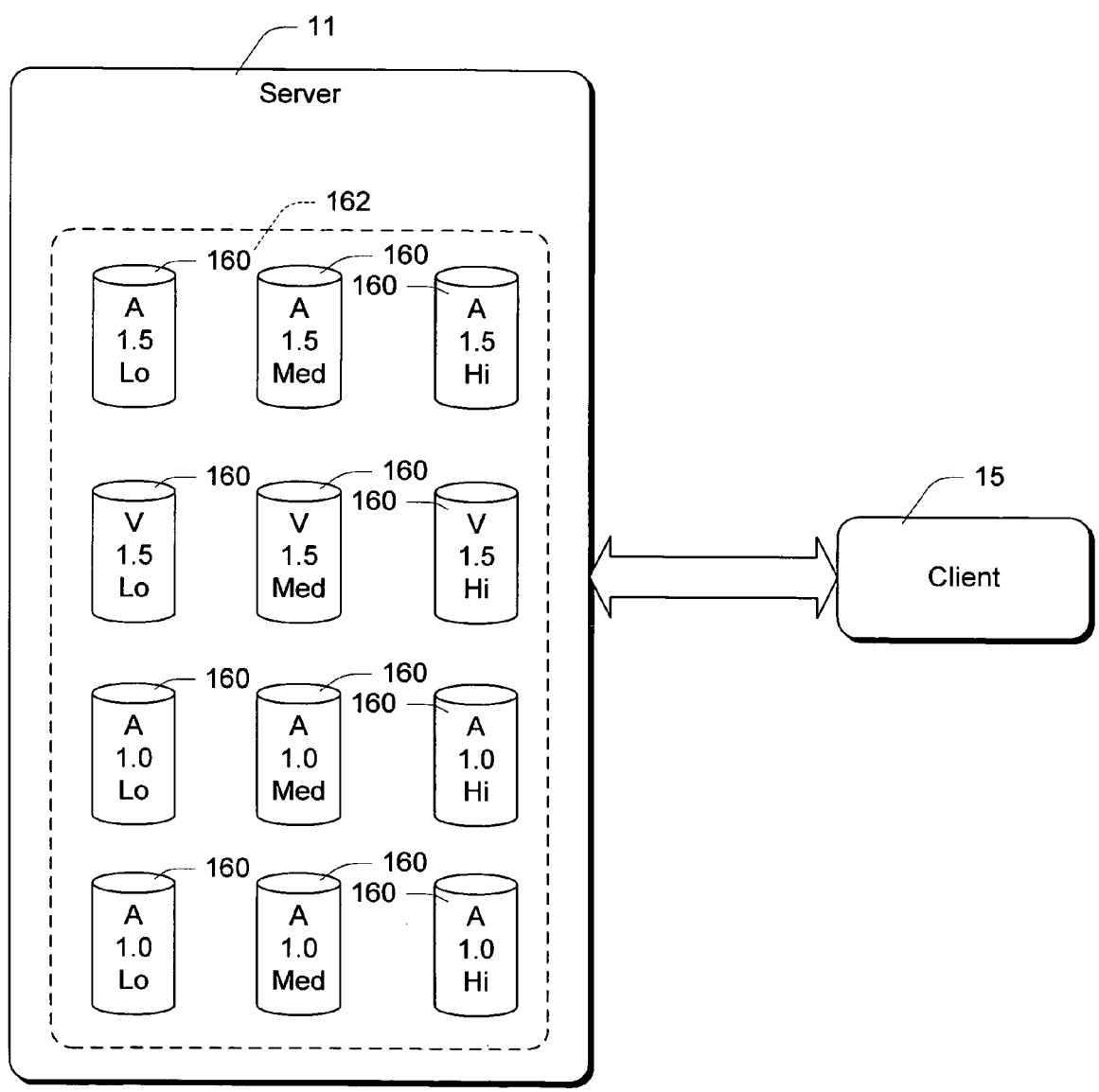
FIG. 4 illustrates an exemplary media server in more detail.

FIG. 4 illustrates an exemplary media server in more detail. As illustrated, server 11 stores multiple media streams 160 corresponding to specific multimedia content 162. The media streams are of different types, such as audio and video. In FIG. 4, audio streams are designated by the letter "A" and video streams are designated by the letter "V". Any combination of a single audio stream and a single video stream can be rendered to produce a version of the multimedia content. This version is provided to the client 15 of FIG. 1 as a composite media stream. However, in order to provide intelligible multimedia presentations to the user, the presentation timelines for the media streams should be at least similar, if not identical. Alternatively, any single audio stream or single video stream can be rendered to produce a version of the multimedia content.

The video streams 160 can differ in any of a variety of manners. For example, different resolution qualities may exist, such as low (lo), intermediate (med), and high (hi) resolutions. Additionally, the media streams may have timelines that are modified by different degrees, as discussed in more detail below. FIG. 4 illustrates the media streams having different speed factors (1.0 and 1.5), indicating how fast the streams are rendered (and thus how much the streams have been compressed) compared to the original or default stream. For example, a speed factor of 1.5 indicates that the stream is to be rendered at 1.5 times the speed at which the original or default stream is rendered.

Media server 11 selects a particular combination of a single audio stream and a single video stream to be the "base" version of the multimedia content. According to one embodiment, the audio and video streams having the speed factors and resolutions as the streams were originally created (or are received in the case of "live" streams) are selected as the base version of the multimedia content. The base version is used as a reference point to identify which segments of the media streams annotations correspond to, as discussed in more detail below.

Timeline modification changes the timeline of the data streams to achieve either time compression or time expansion. With some types of media, such as video streams, this involves either omitting selected frames or modifying the presentation times of the individual data units or video frames. In other cases, such as with audio streams, time-modification is more difficult—simply changing the presentation times would alter the pitch of the original audio and make it unintelligible. Accordingly, some type of audio processing technique is used to time-compress or time-expand audio streams, while maintaining the original pitch of the audio—thereby maintaining the intelligibility of the audio.

There are various known methods of audio time modification, commonly referred to as "time-scale-modification," most of which concentrate on removing redundant information from the speech signal. In a method referred to as sampling, short segments are dropped from the speech signal at regular intervals. Cross fading or smoothing between adjacent segments improves the resulting sound quality.

Another method, referred to as synchronized overlap add method (SOLA or OLA), consists of shifting the beginning of a new speech segment over the end of the preceding segment to find the point of highest cross-correlation (i.e., maximum similarity). The overlapping frames are averaged, or smoothed together, as in the sampling method.

Sampling with dichotic presentation is a variant of the sampling method that takes advantage of the auditory system's ability to integrate information from both ears. In improves on the sampling method by playing the standard sampled signal to one ear and the "discarded" material to the other ear. Intelligibility and compression increase under this dichotic presentation condition when compared with standard presentation techniques.

The methods mentioned above are considered "linear" because all portions of the speech signal are compressed or expanded uniformly. Other methods are considered non-linear because they non-uniformly remove portions of the time signal. One example of a non-linear time-compression method is referred to as pause removal. When using this method, a speed processing algorithm attempts to identify and remove any pauses in a recording. Media server 11 can store different streams resulting from linear time-scale modification or non-linear time-scale modification.

More information regarding audio time modification is given in an article that appeared in the March, 1997, issue of "ACM Transactions on Computer-Human Interaction" (Volume 4, Number 1, pages 3–38) (1997). For purposes of this disclosure, it can be assumed that audio time modification involves some combination of changing individual data stream samples, dropping certain samples, and adjusting presentation times of any samples that are actually rendered.

Annotation Storage Structure

Figure 5:
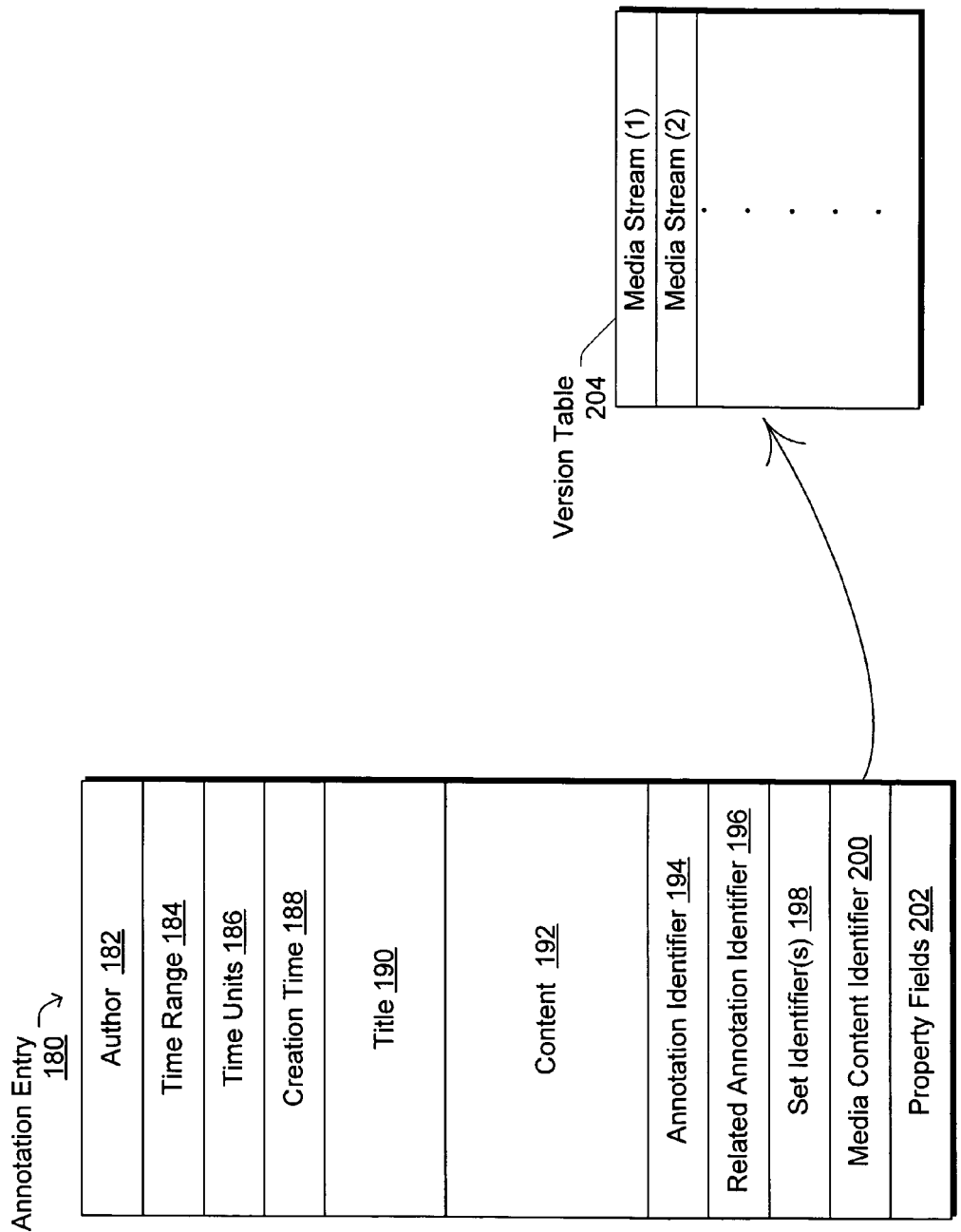
FIG. 5 is a block diagram illustrating an exemplary structure for an annotation.

FIG. 5 shows an exemplary structure for an annotation entry 180 that is maintained by annotation server 10 in annotation meta data store 18 of FIG. 3. In the illustrated example, the annotation entry 180 includes an author field 182, a time range field 184, a time units field 186, a creation time field 188, a title field 190, a content field 192, an identifier field 194, a related annotation identifier field 196, a set identifier(s) field 198, a media content identifier field 200, and an arbitrary number of user-defined property fields 202. Each of fields 182–202 is a collection of data which define a particular characteristic of annotation entry 180. Annotation entry 180 is maintained by annotation server 10 of FIG. 3 in annotation meta data store 18. Content field 192, as discussed in more detail below, includes a pointer to (or other identifier of) the annotation content, which in turn is stored in annotation content store 17.

Author field 182 contains data identifying the user who created annotation entry 180 and who is therefore the author of the annotation. The author is identified by ABE 151 of FIG. 3 based on the user logged into client 15 at the time the annotation is created.

Time range field 184 contains data representing "begin" and "end" times defining a segment of media timeline to which annotation entry 180 is associated. Time units field 186 contains data representing the units of time represented in time range field 184. Together, time range field 184 and time units field 186 identify the relative time range of the annotation represented by annotation entry 180. This relative time range corresponds to a particular segment of the media content to which annotation entry 180 is associated. The begin and end times for the annotation are provided by the user via interface 152 of FIG. 3, or alternatively can be automatically or implicitly derived using a variety of audio and video signal processing techniques, such as sentence detection in audio streams or video object tracking.

The begin and end times stored in time range field 184 reference the version of the media content being played back when annotation entry 180 was created, or alternatively reference the base version. The media content can have multiple different versions, some of which may have different presentation timelines (as discussed in more detail below). The particular range of another version, for instance the one currently being viewed by a user, to which the annotation corresponds can thus be readily determined based on the time range field 184 and time units field 186, in conjunction with the known relationship among the presentation timeline of the base version, the version being viewed, and the version on which the annotation was originally created.

It should be noted that the time ranges for different annotations can overlap. Thus, for example, a first annotation may correspond to a segment ranging between the first and fourth minutes of media content, a second annotation may correspond to a segment ranging between the second and seventh minutes of the media content, and a third annotation may correspond to a segment ranging between the second and third minutes of the media content.

Alternatively, rather than using the presentation timeline of the media content, different media characteristics can be used to associate the annotation with a particular segment(s) of the media content. For example, annotations could be associated with (or "anchored" on) specific objects in the video content, or specific events in the audio content.

Creation time field 188 contains data specifying the date and time at which annotation entry 180 is created. The time of creation of annotation entry 180 is absolute and is not relative to the video or audio content of the media stream to which annotation entry 180 is associated. Accordingly, a user can specify that annotations which are particularly old, e.g., created more than two weeks earlier, are not to be displayed. ABE 132 of FIG. 3 stores the creation time and date when the annotation is created.

Title field 190 contains data representing a title by which the annotation represented by annotation entry 180 is identified. The title is generally determined by the user and the user enters the data representing the title using conventional and well known user interface techniques. The data can be as simple as ASCII text or as complex as HTML code which can include text having different fonts and type styles, graphics including wallpaper, motion video images, audio, and links to other multimedia documents.

Content field 192 contains data representing the substantive content of the annotation as authored by the user. The actual data can be stored in content field 192, or alternatively content field 192 may store a pointer to (or other indicator of) the content that is stored separately from the entry 180 itself. In the illustrated example, content field 192 includes a pointer to (or other identifier of) the annotation content, which in turn is stored in annotation content store 17. The user enters the data representing the content using conventional and well known user interface techniques. The content added by the user in creating annotation entry 180 can include any one or more of text, graphics, video, audio, etc. or links thereto. In essence, content field 192 contains data representing the substantive content the user wishes to include with the presentation of the corresponding media stream at the relative time range represented by time range field 184 and time units field 186.

Annotation identifier field 194 stores data that uniquely identifies annotation entry 180, while related annotation identifier field 196 stores data that uniquely identifies a related annotation. Annotation identifier field 194 can be used by other annotation entries to associate such other annotation entries with annotation entry 180. In this way, threads of discussion can develop in which a second annotation responds to a first annotation, a third annotation responds to the second annotation and so on. By way of example, an identifier of the first annotation would be stored in related annotation identifier field 196 of the second annotation, an identifier of the second annotation would be stored in related annotation identifier field 196 of the third annotation, and so on.

Set identifier(s) field 198 stores data that identifies one or more sets to which annotation entry 180 belongs. Media content can have multiple sets of annotations, sets can span multiple media content, and a particular annotation can correspond to one or more of these sets. Which set(s) an annotation belongs to is identified by the author of the annotation. By way of example, media content corresponding to a lecture may include the following sets: "instructor's comments", "assistant's comments", "audio comments", "text comments", "student questions", and each student's personal comments.

Media content identifier field 200 contains data that uniquely identifies particular multimedia content as the content to which annotation entry 180 corresponds. Media content identifier 200 comprises a media version table 204 that identifies each of the different streams of multimedia content (e.g., streams 160 of FIG. 4) to which annotation entry 180 corresponds. Each annotation corresponding to multimedia content corresponds to each of the different versions of that content via a mapping defined by the media version table 204, and thus to each of the different media streams for that content. Data stored in identifier field 200 associates annotation entry 180 with particular media streams such that annotation server 10 can synchronize substantive content of annotation entry 180 with substantive content of the media streams.

The data stored in media version table 204 can identify media versions in a variety of different manners. According to one embodiment, the data represents a real-time transport protocol (RTP) address of the different media streams (e.g., streams 160 of FIG. 4). An RTP address is a type of uniform resource locator (URL) by which multimedia documents can be identified in a network. According to an alternate embodiment, a unique identifier is assigned to the content (e.g., content 162 of FIG. 4) rather than to the individual media streams. According to another alternate embodiment, a different unique identifier of the media streams could be created by annotation server 10 of FIG. 3 and assigned to the media streams. Such a unique identifier would also be used by streaming media server of FIG. 1 to identify the media streams. According to another alternate embodiment, a uniform resource name (URN) such as those described by K. Sollins and L. Mosinter in "Functional Requirements for Uniform Resource Names," IETF RFC 1733 (December 1994) could be used to identify the media stream.

User-defined property fields 202 are one or more user-definable fields that allow users (or user interface designers) to customize the annotation system. Examples of such additional property fields include a "reference URL" property which contains the URL of a web page used as reference material for the content of the annotation; a "help URL" property containing the URL of a help page which can be accessed concerning the content of the annotation; a "view script" property containing JavaScript which is to be executed whenever the annotation is viewed; a "display type" property, which gives the client user interface information about how the annotation is to be displayed; etc.

Figure 6:
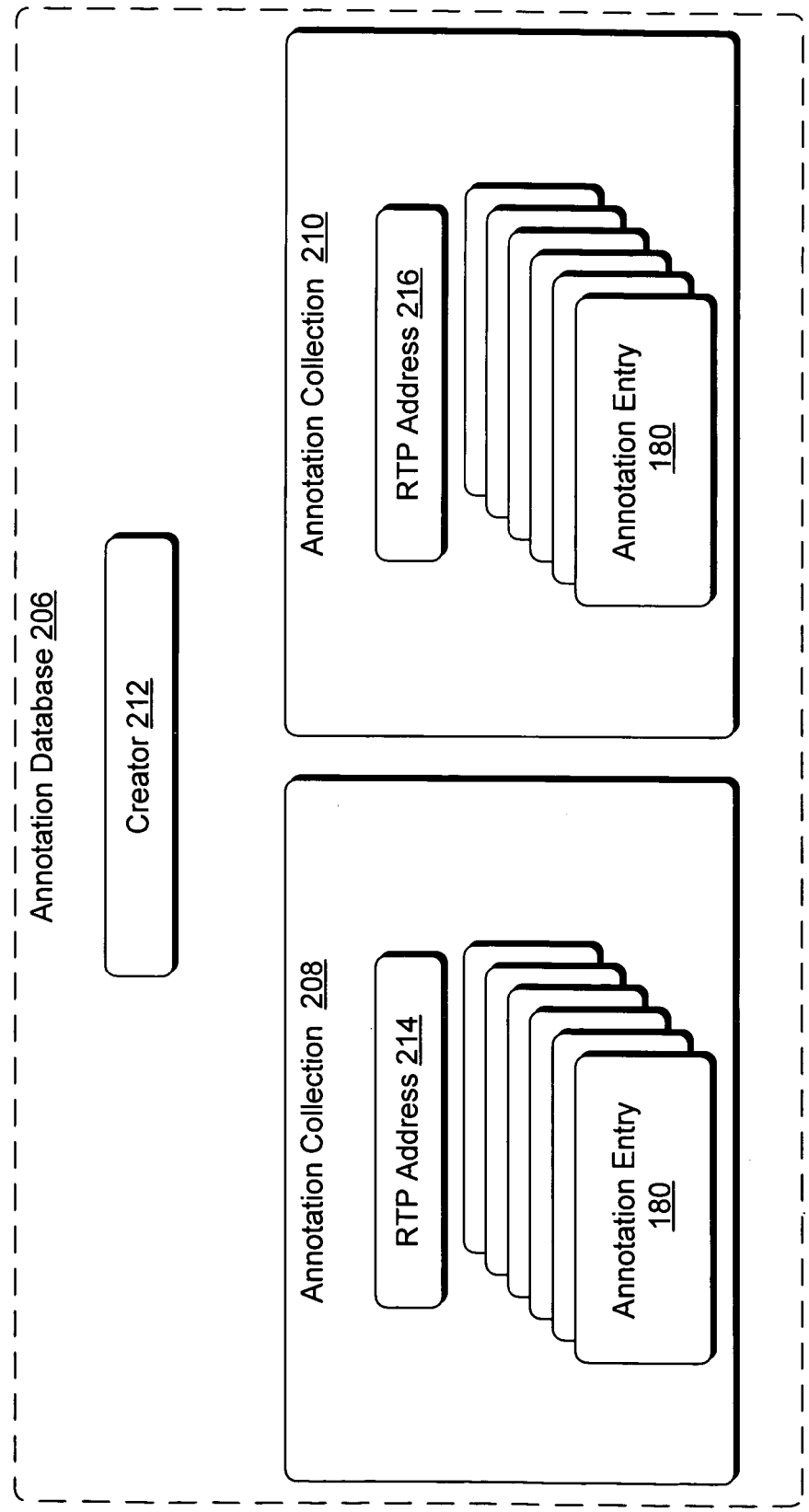
FIG. 6 is a block diagram illustrating exemplary annotation collections.

FIG. 6 illustrates exemplary implicit annotation collections for annotations maintained by annotation server 10 of FIG. 3. A collection of annotations refers to annotation entries 180 of FIG. 5 that correspond to the same media stream(s), based on the media content identifier 200. Annotation entries 180 can be viewed conceptually as part of the same annotation collection if they have the same media content identifiers 200, even though the annotation entries may not be physically stored together by annotation server 10.

Annotation database 206 includes two annotation collections 208 and 210. Annotation server 10 dynamically adds, deletes, and modifies annotation entries in annotation database 206 based on commands from client 15. Annotation entries can be created and added to annotation database 206 at any time a user cares to comment upon the content of the stream (or another annotation) in the form of an annotation. Annotation server 10 forms an annotation entry from identification data, content data, title data, and author data of an "add annotation" request received from the client's ABE 151 (FIG. 3), and adds the annotation entry to annotation database 206.

Annotation database 206 includes fields 212, 214, and 216 that specify common characteristics of all annotation entries of database 206 or an annotation collection 208 or 210. Alternatively, fields 212–216 can be included redundantly in each annotation entry 180.

Creator field 212 contains data identifying the user who was responsible for creating annotation database 206.

RTP address fields 214 and 216 contains data representing an RTP address of the media content (e.g., the RTP addresses of each of the different streams contained in version table 204) for the annotation collection. An RTP address provides an alternative mechanism, in addition to the data in identifier field 200 of FIG. 5, for associating the media content with annotation entries 180. In alternative embodiments, RTP address fields 214 and 216 need not be included, particularly embodiments in which media version table 204 contains the RTP address of the media stream.

User Interface

An annotation can be created by a user of any of the client computers 15 of FIG. 1. As discussed above with reference to FIG. 3, client 15 includes an interface module 152 that presents an interface to a user (e.g., a graphical user interface), allowing a user to make requests of annotation server 10. In the illustrated example, a user can access annotation server 10 via an annotation toolbar provided by interface 152.

Figure 7:
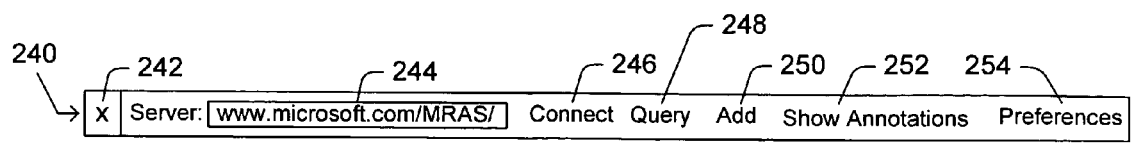
FIG. 7 illustrates an annotation toolbar in accordance with the invention.

FIG. 7 illustrates an annotation toolbar in accordance with the invention. Annotation toolbar 240 includes various identifying information and user-selectable options 242–254.

Selection of an exit or "X" button 242 causes interface 152 to terminate display of the toolbar 240. A server identifier 244 identifies the annotation server with which client 15 is currently configured to communicate (annotation server 10 of FIG. 1 in the illustrated embodiment).

Selection of a connection button 246 causes ABE 151 of FIG. 3 to establish a connection with the annotation server identified by identifier 244. Selection of a query button 248 causes interface module 152 to provide a "query" interface, from which a user can enter search criteria to find particular annotations. Selection of an add button 250 causes interface module 152 to open an "add new annotation" dialog box, from which a user can create a new annotation.

Selection of a show annotations button 252 causes interface module 152 to provide a "view annotations" interface, from which a user can select particular annotations for presentation.

Selection of a preferences button 254 causes interface 152 of FIG. 3 to open a "preferences" dialog box, from which a user can specify various UI preferences, such as an automatic server query refresh interval, or default query criteria values to be persisted between sessions.

Annotation Creation

Figure 8:
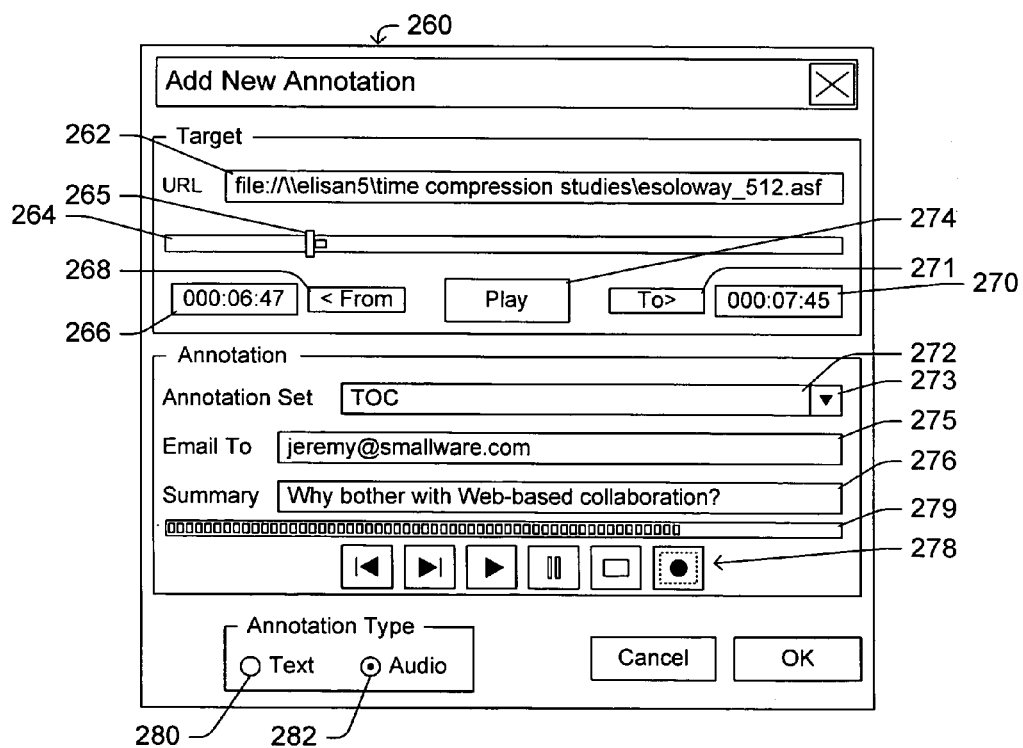
FIG. 8 illustrates an "add new annotation" dialog box in accordance with the invention.

FIG. 8 shows an "add new annotation" dialog box 260 that results from user selection of add button 250 of FIG. 7 to create a new annotation. Interface 150 assumes that the current media stream being presented to the user is the media stream to which this new annotation will be associated. The media stream to which an annotation is associated is referred to as the "target" of the annotation. An identifier of the target stream is displayed in a target specification area 262 of dialog box 260. Alternatively, a user could change the target of the annotation, such as by typing in a new identifier in target area 262, or by selection of a "browse" button (not shown) that allows the user to browse through different directories of media streams.

A time strip 264 is also provided as part of dialog box 260. Time strip 264 represents the entire presentation time of the corresponding media stream. A "thumb" 265 is movable within time strip 264 to allow a user to set a particular temporal position within the media stream. The annotation being created via dialog box 260 has a begin time and an end time, which together define a particular segment of the media stream. When "from" button 268 is selected, thumb 265 represents the begin time for the segment relative to the media stream. When "to" button 271 is selected, thumb 265 represents the end time for the segment relative to the media stream. Alternatively, two different thumbs could be displayed, one for the begin time and one for the end time. The begin and end times are also displayed in an hours/minutes/seconds format in boxes 266 and 270, respectively.

Thumb 265 can be moved along time strip 264 in any of a variety of conventional manners. For example, a user can depress a button of a mouse (or other cursor control device) while a pointer is "on top" of thumb 265 and move the pointer along time strip 264, causing thumb 265 to move along with the pointer. The appropriate begin or end time is then set when the mouse button is released. Alternatively, the begin and end times can be set by entering (e.g., via an alphanumeric keyboard) particular times in boxes 266 and 270.

Dialog box 260 also includes a "play" button 274. Selection of play button 274 causes interface module 152 of FIG. 3 to forward a segment specification to web browser 153 of client 15. The segment specification includes the target identifier from target display 262 and the begin and end times from boxes 266 and 270, respectively. Upon receipt of the segment specification from interface module 152, the browser communicates with media server 11 and requests the identified media segment using conventional HTTP requests. In response, media server 11 streams the media segment to client 15 for presentation to the user. This presentation allows, for example, the user to verify the portion of the media stream to which his or her annotation will correspond.

Dialog box 260 also includes an annotation set identifier 272, an email field 275, and a summary 276. Annotation set identifier 272 allows the user to identify a named set to which the new annotation will belong. This set can be a previously defined set, or a new set being created by the user. Selection of the particular set can be made from a drop-down menu activated by selection of a button 273, or alternatively can be directly input by the user (e.g., typed in using an alphanumeric keyboard). According to one embodiment of the invention, annotation server 10 of FIG. 3 supports read and write access controls, allowing the creator of the set to identify which users are able to read and/or write to the annotation set. In this embodiment, only those sets for which the user has write access can be entered as set identifier 272.

Email identifier 275 allows the user to input the email address of a recipient of the annotation. When an email address is included, the newly created annotation is electronically mailed to the recipient indicated in identifier 275 in addition to being added to the annotation database. Furthermore, the recipient of the electronic mail message can reply to the message to create an additional annotation. To enable this, the original email message is configured with annotation server 10 as the sender. Because of this, a "reply to sender" request from the recipient will cause an email reply to be sent to annotation server 10. Upon receipt of such an electronic mail message reply, annotation server 10 creates a new annotation and uses the reply message content as the content of the new annotation. This new annotation identifies, as a related annotation, the original annotation that was created when the original mail message was sent by annotation server 10. In the illustrated embodiment, this related annotation identifier is stored in field 196 of FIG. 5.

Summary 276 allows the user to provide a short summary or title of the annotation content. Although the summary is illustrated as being text, it could include any of a wide variety of characters, alphanumerics, graphics, etc. In the illustrated embodiment, summary 276 is stored in the title field 190 of the annotation entry of FIG. 5.

Dialog box 260 further includes radio buttons 280 and 282, which allow an annotation to be created as text and/or audio. Although not shown, other types of annotations could also be accommodated, such as graphics, HTML documents, etc. Input controls 278 are also provided as part of dialog box. The illustrated controls are enabled when the annotation includes audio data. Input controls 278 include conventional audio control buttons such as fast forward, rewind, play, pause, stop and record. Additionally, an audio display bar 279 can be included to provide visual progress feedback when the audio is playing or recording.

The exact nature of input controls 278 is dependent on the type of annotation content being provided. In the case of text content, input controls 278 may simply include a box into which text can be input by the user via an alphanumeric keyboard. Additionally, a keyboard layout may also be provided to the user, allowing him or her to "point and click" using a mouse and pointer to select particular characters for entry.

Upon receipt of an add annotation request (whether by email or from interface 152 of FIG. 3), annotation server 10 of FIG. 3 determines which different versions of multimedia content the annotation corresponds to. Annotation server 10 receives an indication of the target stream for the annotation. This target stream is a particular version of the multimedia content to which the annotation corresponds, and may be an individual media stream or a composite media stream. Upon receipt of the add annotation request, annotation server 10 communicates the target stream information to media server 11 of FIG. 1. Media server 11, knowing which different media streams correspond to the multimedia content, communicates the identifiers of the different streams of the multimedia content to annotation server 10. Alternatively, client computer 15 of FIG. 1 may have identifiers of the different streams and may communicate those identifiers to annotation server 10, or groups of "equivalent" media streams may have been previously created on the annotation server 10 by an administrator.

As part of the add annotation request client computer 15 of FIG. 1 determines the appropriate time range for the annotation and provides the time range to annotation server 10. Alternatively, annotation server 10 may make this determination based on information received from client computer 15. As discussed above, a user indicates the desired time range of the media content to which the annotation corresponds via boxes 266 and 270. However, the begin and end times provided by the user refer to particular times of the version of the multimedia content being provided to the user. In embodiments where the time range is stored in range field 184 of FIG. 5 with reference to a base version, then the user-indicated time range is converted from the timeline of the version being viewed to the base version.

When the version of the multimedia content currently being provided to the user is time compressed using linear time compression, client computer 15 of FIG. 1 knows the time compression factor of the version of the multimedia content currently being provided to the user of client 15. Client computer 15 also knows, or alternatively receives from media server 11, an indication of the time compression factor of the base version of the multimedia content. Using the relationship between the two time compression factors, client computer 15 can readily determine the begin and end times with reference to the base version. Specifically, the point in time of the base version that a particular begin time or end time corresponds to can be determined using the following calculation:

$$basetime = currenttime \times \frac{basefactor}{currentfactor}$$

In this calculation, basetime is the presentation time in the base version, currenttime is the presentation time in the version currently being presented to the user, currentfactor is the playback speed or factor of the version currently being presented to the user, and basefactor is the playback speed or factor of the base version. Analogous calculations can be performed during playback to determine the points in time of the base version corresponding to the points in time of the version which is being played back.

However, in embodiments where the time range stored in field 184 of FIG. 5 is in reference to the timeline of the version being presented when the annotation was created, conversions to a base timeline are not needed. Rather, conversion from the stored version to the currently playing version can be made as the current version is played back.

Alternatively, such as when the time compression difference between the version of the multimedia content currently being provided to the user and the base version is nonlinear, a different methodology can be used. Annotation 10 server of FIG. 1 maintains a record (e.g., a table) of the correlation between the timelines of the non-linearly compressed version and the base version. This record can then be communicated to client computer 15 in order for client computer 15 to identify the point in time of the base version to which a particular begin time or end time corresponds.

Figure 9:
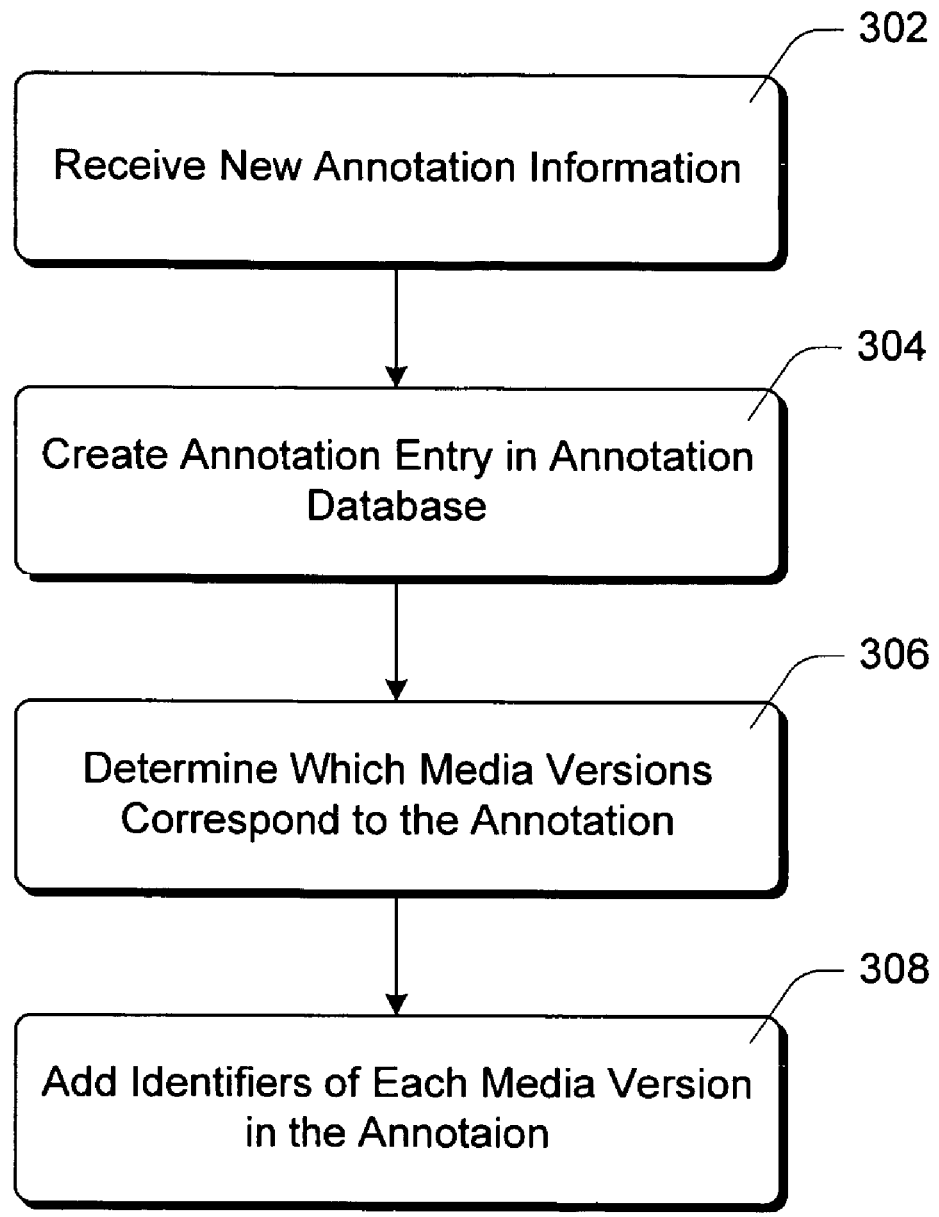
FIG. 9 illustrates methodological aspects of the invention in creating annotations.

FIG. 9 illustrates methodological aspects of the invention in creating annotations. The steps shown in FIG. 9 are implemented by annotation server 10 of FIG. 3, and may be performed in software. These steps are described with additional reference to the preceding figures.

A step 302 comprises receiving new annotation information. Annotation server 10 can receive this new annotation information via an add annotation request from interface 150 of FIG. 3, or alternatively can be received as an email message from email server 13 of FIG. 1.

A step 304 comprises creating an annotation entry in an annotation database using the information received in step 302.

A step 306 comprises determining which media versions correspond to the annotation. Annotation server 10 communicates with media server 11 of FIG. 1 to determine the different versions of the multimedia content to which the annotation corresponds.

A step 308 comprises adding identifiers of each media version to the annotation. A collection of annotations may have a single record of corresponding media versions, or alternatively each individual annotation may maintain a record of corresponding media versions.

It should be noted that in some embodiments, steps 306 and 308 need not be repeated for each new annotation. For example, in embodiments where a single media version table is maintained for a collection of annotation entries, as illustrated in FIG. 6, each new annotation entry in the collection of annotation entries will correspond to the same multiple versions as the previous entries in the collection. Thus, an additional determination and adding of identifiers in steps 306 and 308 is not necessary.

Annotation and Media Segment Presentation

Figure 10:
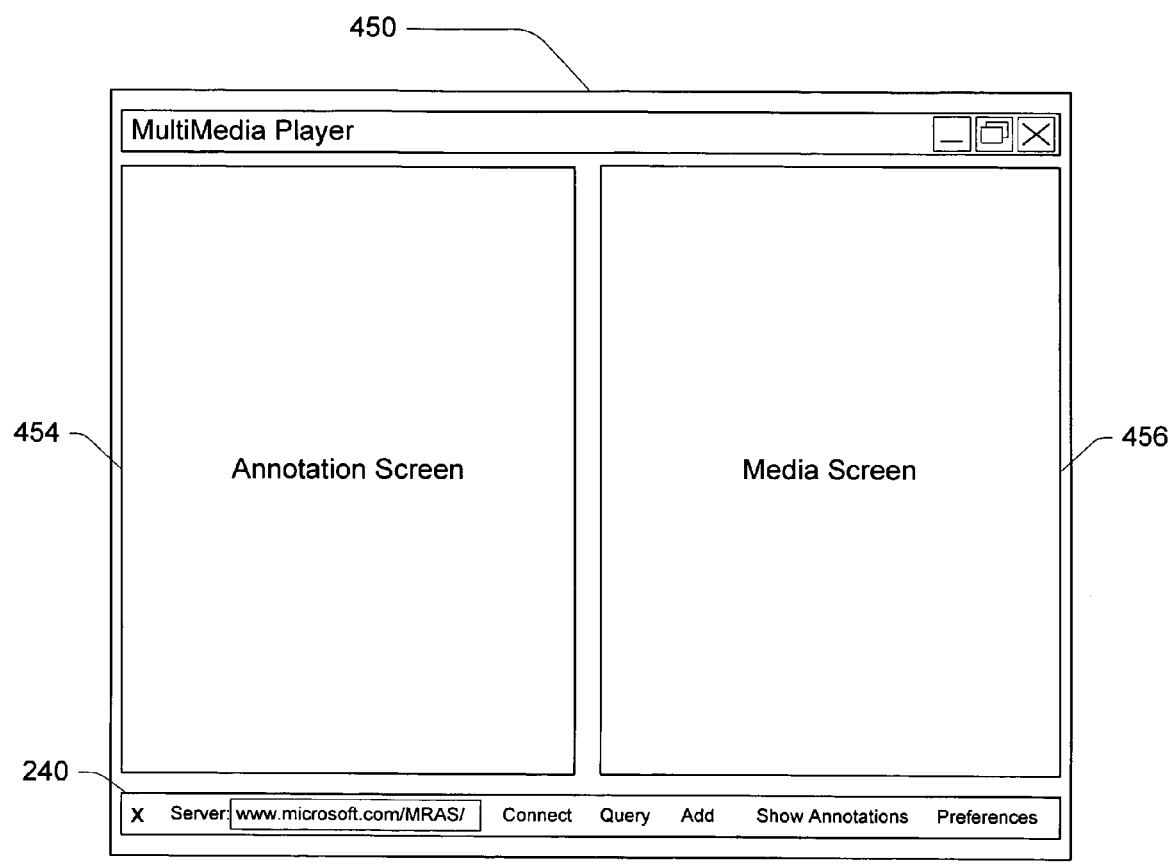
FIG. 10 is a diagrammatic illustration of a graphical user interface window displaying annotations and corresponding media segments concurrently in accordance with the invention.

FIG. 10 shows one implementation of a graphical user interface window 450 that concurrently displays annotations and corresponding media segments at client computer 15 of FIG. 1. This UI window 450 has an annotation screen 454, a media screen 456, and a toolbar 240.

Media screen 456 is the region of the UI within which the multimedia content is rendered. For video content, the video is displayed on screen 456. For non-visual content, screen 456 displays static or dynamic images representing the content. For audio content, for example, a dynamically changing frequency wave that represents an audio signal could be displayed in media screen 456.

Annotation screen 454 is the region of the UI within which the annotations are rendered. For video, graphical, and text annotations, the video, graphical, or text content of the annotation is displayed on screen 454. For non-visual content, screen 454 displays static or dynamic images representing the annotation content, such as the title or summary of the annotation, or a dynamically changing frequency wave in the case of audio content.

The annotations provided by annotation server 10 of FIG. 1 and the media content provided by media server 11 are presented to the user of client computer 15 concurrently via UI window 450. The annotation server 10 communicates with the client computer 15 to determine the presentation timeline (e.g., the speed factor being used) of the media content currently being presented. Given the presentation timeline and other retrieval criteria, annotation server 10 can compare the current presentation time to the time ranges maintained in annotation entries 180 of FIG. 5 to determine which annotations are to be provided to the client computer at the current time and what their time range information should be. It should be noted that, since the time range information is maintained in annotation entries 180 with reference to a base version (or alternatively the version on which the annotation was originally created), additional time conversions may need to be performed (e.g., at the client computer 15 or annotation server 10) in order to accurately compare the presentation timeline of the media version being presented to the base version, for instance, when the time compression ratio for an audio/video composite stream is altered dynamically by the user of client 15. These conversions can be performed analogous to those discussed above with reference to creating annotations.

Figure 11:
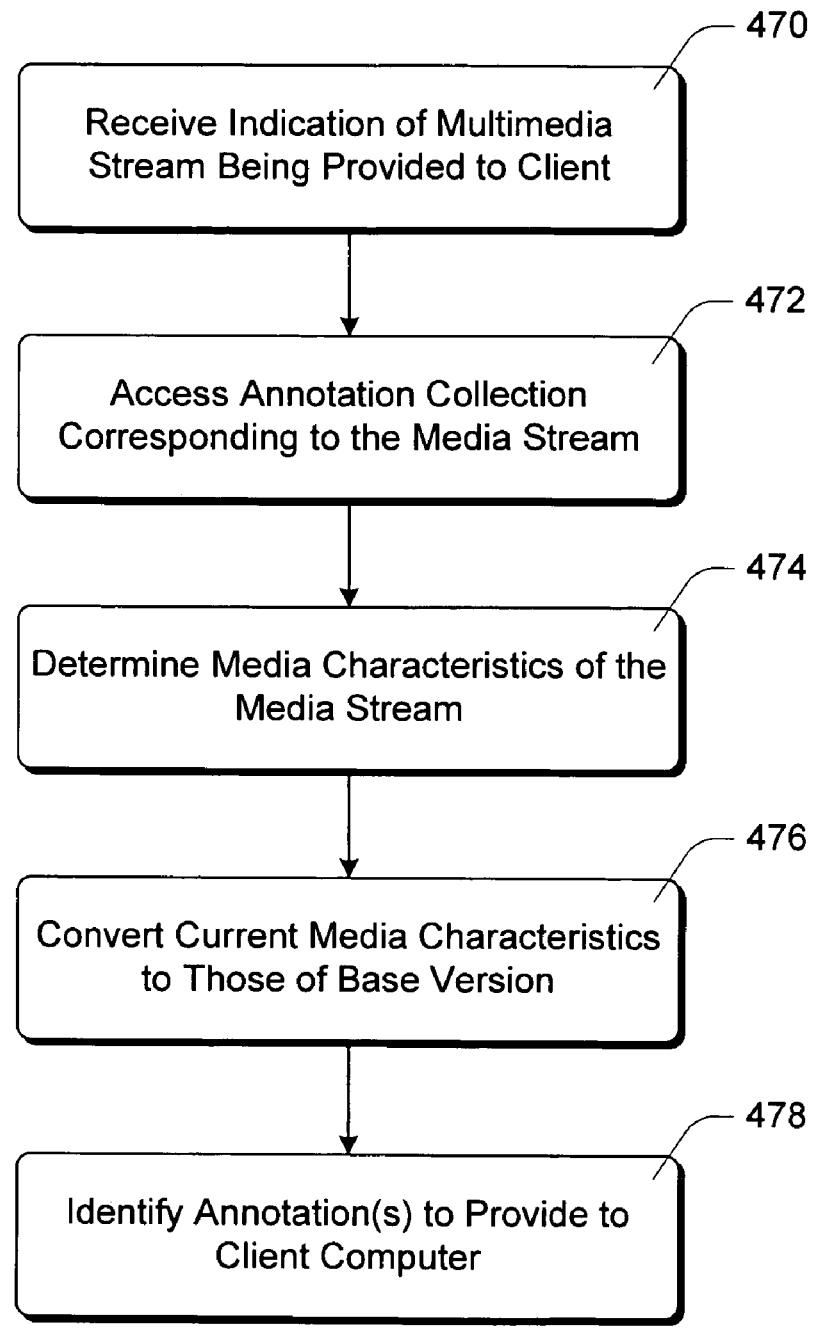
FIG. 11 illustrates methodological aspects of the invention in providing annotations to a client computer.

FIG. 11 illustrates methodological aspects of the invention in providing annotations to a client computer. The steps shown in FIG. 11 are implemented by annotation server 10 of FIG. 3, and may be performed in software. These steps are described with additional reference to the preceding figures.

A step 470 comprises receiving, from client computer 15 of FIG. 1, an indication of the media stream being provided to the client computer 15 from media server 11 of FIG. 1.

A step 472 comprises accessing an annotation collection corresponding to the media stream. Annotation server 10 determines, based on the indication received in step 470, the collection of annotations that correspond to the media stream being provided to client computer 15.

A step 474 comprises determining the media characteristics (e.g., the playback speed) of the media stream. The media characteristics of the media stream can be provided to annotation server 10 from client computer 15 or media server 11, or can be derived from the version table 204 in FIG. 5 by comparing the target media stream to other versions of the same content in the table.

A step 476 comprises converting the media characteristics of the media stream to those of the base version of the content (e.g., current playback time of the media stream to the timeline of the base version). This conversion can be done in a linear calculation or table lookup manner, as discussed above.

A step 478 comprises identifying one or more annotations to provide to the client computer. The annotations of the collection accessed in step 472 are compared to the current base version time determined in step 476. Any annotations with a time range in the neighborhood of the corresponding current base version time are provided to the client computer 15 for presentation to the user.

CONCLUSION

The invention described above provides annotations for multiple versions of media content. A single annotation advantageously corresponds to multiple different versions of multimedia content, each such version being a different media stream(s). Thus, different versions of media content can be provided to users and can be annotated, with the annotations corresponding to all of the different versions of the media content.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable medium containing a plurality of instructions which when executed cause a system to perform acts comprising:
   receiving a new annotation object;
   determining an annotation identifier of the new annotation object;
   determining a first set of version identifiers identifying each version of a first multimedia content to which the annotation object corresponds;
   determining a first media characteristic that associates the new annotation object to a portion of a version of the first multimedia content;
   storing the annotation identifier, the first set of version identifiers and the first media characteristic as a first annotation entry in a metadata store; and
   storing the new annotation object in a content store;
   wherein determining the first media characteristic that associates the new annotation object to a portion of the first multimedia content comprises:
      determining a target media characteristic that associates the new annotation object to a portion of a target version of the first multimedia content; and
      converting the target media characteristic to a base media characteristic.

2. The computer-readable medium according to claim 1, wherein the target media characteristic is converted to the base media characteristic as a function of a temporal parameter of the target version of the first multimedia content and a temporal parameter of a base version of the first multimedia content.

3. The computer-readable medium according to claim 2, wherein the base version of the first multimedia content comprises a particular combination of a plurality of individual media streams.

4. The computer-readable medium according to claim 2, wherein the base version of the first multimedia content is the originally created version of the multimedia content.

5. The computer-readable medium according to claim 2, wherein the target version of the first multimedia content comprises a given combination of a plurality of individual media streams that creation of the new annotation object is based upon.

6. One or more computer-readable medium containing a plurality of instructions which when executed cause a system to perform acts comprising:
   receiving a new annotation object;
   determining an annotation identifier of the new annotation object;
   determining a first set of version identifiers identifying each version of a first multimedia content to which the annotation object corresponds;
   determining a first media characteristic that associates the new annotation object to a portion of a version of the first multimedia content;
   storing the annotation identifier, the first set of version identifiers and the first media characteristic as a first annotation entry in a metadata store; and
   storing the new annotation object in a content store
   further comprising:
      determining a version identifier of a second multimedia content being presented to a user;
      identifying each of a plurality of annotation entries in the metadata store that contain the received version identifier;
      retrieving each of a plurality of annotation objects respectively corresponding to each of the identified plurality of annotation entries from the content store; and
      rendering the plurality of annotation objects concurrently with the second multimedia content, wherein each of the plurality of annotation objects is presented proximate a respective media characteristic identified in the corresponding one of the identified plurality of annotation entries,
   wherein the first annotation entry further includes one or more determined items of information selected from a group consisting of an author, a creation time, a title, a related annotation identifier, an annotation set identifier and a user-defined property, further comprising ordering the rendering of a set of the plurality of annotation objects as a function of the related annotation identifier contained in each of the identified plurality of annotation entries that contain the same media characteristic identifier.

7. One or more computer-readable medium containing a plurality of instructions which when executed cause a system to perform acts comprising:
   receiving a new annotation object;
   determining an annotation identifier of the new annotation object;
   determining a first set of version identifiers identifying each version of a first multimedia content to which the annotation object corresponds;
   determining a first media characteristic that associates the new annotation object to a portion of a version of the first multimedia content;
   storing the annotation identifier, the first set of version identifiers and the first media characteristic as a first annotation entry in a metadata store; and
   storing the new annotation object in a content store further comprising:
      determining a version identifier of a second multimedia content being presented to a user;
      identifying each of a plurality of annotation entries in the metadata store that contain the received version identifier;
      retrieving each of a plurality of annotation objects respectively corresponding to each of the identified plurality of annotation entries from the content store; and
      rendering the plurality of annotation objects concurrently with the second multimedia content, wherein each of the plurality of annotation objects is presented proximate a respective media characteristic identified in the corresponding one of the identified plurality of annotation entries,
wherein the first annotation entry further includes one or more determined items of information selected from a group consisting of an author, a creation time, a title, a related annotation identifier, an annotation set identifier and a user-defined property
further comprising grouping the rendering of a set of the plurality of annotation objects as a function of the annotation set identifier contained in each of the identified plurality of annotation entries.

8. One or more computer-readable medium containing a plurality of instructions which when executed cause a system to perform acts comprising:
receiving an indication of a Real-time Transport Protocol (RTP) address of a current multimedia content being presented to a user;
identifying one of a plurality of annotation collections having an RTP address corresponding to the received RTP address;
identifying each of a plurality of annotation entries of the one of the plurality of annotation collections;
determining a current media characteristic, of the current multimedia content; converting the current media characteristic of the current multimedia content to a base media characteristic; and
rendering each of a plurality of annotation objects corresponding to an annotation identifier contained in each of the identified plurality of annotation entries, wherein each annotation object is rendered concurrently with the current multimedia content proximate the respective base media characteristic identified in the respective one of the plurality of annotation entries.

9. The computer-readable medium according to claim 8, further comprising:
receiving a first annotation object corresponding to a first multimedia content;
creating a first annotation entry comprising:
a first annotation identifier corresponding to the first annotation object;
a first media characteristic for synchronizing the first annotation object with a first portion of the first multimedia content; and
a first set of version identifiers corresponding to a plurality of versions of the first multimedia content;
storing the first annotation entry; and
storing the first annotation object.

10. The computer-readable medium according to claim 9, further comprising:
receiving a second annotation object corresponding to the first multimedia content;
creating a second annotation entry comprising:
a second annotation identifier corresponding to the second annotation object;
a second media characteristic for synchronizing the second annotation object with a second portion of the first multimedia content; and
the first set of version identifiers corresponding to the plurality of version of the first streaming multimedia content;
storing the second annotation entry; and
storing the second annotation object.

11. The computer-readable medium according to claim 10, wherein the first annotation entry and the second annotation entry are stored in a first annotation collection.

12. The computer-readable medium according to claim 11, further comprising:
receiving a third annotation object corresponding to a second multimedia content;
creating a third annotation entry comprising:
a third annotation identifier corresponding to the third annotation object;
a third media characteristic for synchronizing the third annotation object with a first portion of the second multimedia content; and
a second set of version identifiers corresponding to a plurality of versions of the second multimedia content;
storing the third annotation entry; and
storing the third annotation object.

13. The computer-readable medium according to claim 12, wherein the third annotation entry is stored in a second annotation collection.

14. The computer-readable medium according to claim 9, further comprising:
receiving a second annotation object corresponding to a second multimedia content;
generating a second annotation entry comprising:
a second annotation identifier corresponding to the second annotation object;
a second media characteristic for synchronizing the second annotation object with a first portion of the second multimedia content; and
a second set of version identifiers corresponding to a plurality of version of the second multimedia content;
storing the second annotation entry; and
storing the second annotation object.

15. The computer-readable medium according to claim 14, wherein: the first annotation entry is stored in a first annotation collection; and the second annotation entry is stored in a second annotation collection.

* * * * *